United States Patent [19]

Mund et al.

[11] 3,790,410

[45] Feb. 5, 1974

[54] METHOD FOR THE MANUFACTURE OF POWDERED TUNGSTEN CARBIDE CONTAINING ELECTRODE MATERIAL

[75] Inventors: Konrad Mund; Gerhard Richter; Magdalena Wenzel, all of Erlangen, Germany

[73] Assignee: Siemens Aktiengesellschaft, Berlin and Munich, Germany

[22] Filed: Feb. 17, 1972

[21] Appl. No.: 227,310

[30] Foreign Application Priority Data
Feb. 22, 1971  Germany............................ 2108396

[52] U.S. Cl................... 136/122, 252/422, 252/443, 264/29
[51] Int. Cl. .......................................... H01m 13/04
[58] Field of Search .... 136/121, 122; 252/443, 447, 252/422, 425, 504; 423/440, 561; 264/29

[56] References Cited
UNITED STATES PATENTS

| 3,297,490 | 1/1967 | Barber et al. ....................... 136/122 |
| 3,413,152 | 11/1968 | Folkins et al. ................... 136/122 X |
| 2,083,303 | 6/1937 | Krczil................................. 252/423 |
| 3,248,303 | 4/1966 | Doying............................ 252/425 X |

FOREIGN PATENTS OR APPLICATIONS

| 2,005,395 | 8/1971 | Germany ............................ 136/122 |
| 213,252 | 2/1925 | Great Britain ...................... 252/425 |

*Primary Examiner*—L. Dewayne Rutledge
*Assistant Examiner*—M. J. Andrews
*Attorney, Agent, or Firm*—Arthur E. Wilfond

[57] ABSTRACT

Method of making electrode material containing tungsten carbide particles which comprises mixing tungsten carbide with a solid or liquid cokable organic substance. A solution of such organic substance may also be used. The organic substance in the mixture is precoked. The organic substance is subsequently coked at a temperature of 800° to 1,000° C.

12 Claims, No Drawings

METHOD FOR THE MANUFACTURE OF POWDERED TUNGSTEN CARBIDE CONTAINING ELECTRODE MATERIAL

The present invention relates to a method for the manufacture of electrode material in powder form containing tungsten carbide for electrochemical cells, particularly fuel cells.

It is known to use tungsten carbide as the catalyst for the anodic oxidation of fuels, for instance, hydrogen in fuel cells with an acid electrolyte. Tungsten carbinde, WC, can be manufactured, for instance, by carburization of metallic tungsten with carbon or lamp black or with carbonaceous gases, such as carbon monoxide or methane, at temperatures above 700° C. For the manufacture of gas electrodes containing tungsten carbide, WC powder can be mixed with polymers and pore forming materials or with porous additives, such as activated charcoal, at either cold or at elevated temperature. Tungsten disulfide, $WS_2$, which can also be used as a catalyst for anodic oxidation, can be manufactured by thermal treatment of ammonium thiotungstate under a protective gas. As the electric conductivity of $WS_2$ is low, in order to obtain sufficient conductivity, to manufacture porous gas diffusion electrodes made from $WS_2$, carbon powder is admixed to the catalyst ($WS_2$), together with polyethylene as a binder, followed by subsequent pressing and sintering. For the manufacture of electrodes, thiotungstate can also be adsorbed on activated charcoal and subsequently reacted with acid to form trisulfide, which is converted to disulfide by a thermal treatment. The carbon carrier with the $WS_2$ is then pressed with a binder into electrodes and sintered at 150° C in an argon-hydrogen atmosphere.

Difficulties are encountered in the manufacture of unbonded electrodes which contain the electrode or catalyst material in powder form. In the preparation of tungsten carbide from tungstic acid through reduction with hydrogen and through carburization with carbon monoxide, for instance, the tungsten carbide is obtained with particle sizes of less than 1 $\mu$. The use of such particles in powder electrodes leads to various problems. On one hand, applying contacts is a problem as it is impossible to make, with justifiable effort, a conducting grid or screen which is permeable to gas and has at the same time pores so fine that the catalyst particles do not pass into the gas space through the screen. On the other hand, the diameter of the pores which form between the particles also depends on the order of magnitude of the particles. High capillary pressures are developed in the narrow pores between small particles if the pores are filled with liquid. The development of a three-phase boundary can be achieved only by very high gas pressures.

In the case of bonded electrodes, these difficulties do not occur as in the manufacture of these electrodes, through the application of pore forming materials, by known methods, transport pores can be produced which are filled with gas even at low gas pressures and therefore make possible the transport of the reaction gas to the point of reaction. However, especially with high-performance electrodes, the application of organic binders can have a detrimental effect as the binders have insulating properties and therefore impede the conduction of the current. The binders, even entirely, exclude a portion of the particles from the conduction of the current and therefore from participation in the electrode process.

A method has already been proposed for the manufacture of an electrode containing tungsten carbide, wherein the WC catalyst particles are held together by silver. This electrode material is distinguished because of the favorable structure, by a high carrying capacity. The manufacture, however, is expensive.

It is an object of the invention to provide a method for the manufacture of an electrode material containing tungsten carbide in powder form, in which the difficulties mentioned are not present and the stated shortcomings are avoided. In particular, the particle size of the powdered electrode material should not be too small, and the electrode material should meet the requirement of high conductivity.

This is achieved herein by intimately mixing tungsten carbide with a solid or liquid organic cokable substance or with a solution thereof. The organic substance in the mixture is precoked and is subsequently coked by heating to 800° to 1,000° C, preferably to 900° C. The final product is then pulverized, which is accomplished by methods known per se. The material is comminuted to form a powder of the desired grain size, which is matched to the intended application.

According to the invention there is formed, by coking of an organic substance, carbon which functions as a binder and connects the fine tungsten carbide particles to form larger particles. The carbon formed is conductive, porous, uniformly mixed with the tungsten carbide and is corrosion resistant up to high potentials. The conductivity of a coking product prepared from polyacrylonitrile at 800° C is, for instance, 0.035/ohm·cm. Due to the high conductivity, carbon prepared in this manner also can advantageously serve for holding the material together and for the conduction of the current, with catalytic materials of low or poor conductivity. An example is tungsten disulfide, which can be manufactured by one of the known methods.

Suitable organic substances for the method according to the invention are all carbonaceous substances which can be uniformly and intimately mixed with tungsten carbide and which have a carbon residue in the coking process. Such substances can advantageously be carbohydrates such as sugar or starch, and polymer compounds such as polyvinyl alcohol, polyacrylic acid, polyglycol, polyacrylonitrile, polyethylene and polyvinylidene chloride.

Suspensions of WC are advantageously prepared in a solution of a melt of the organic substance from tungsten carbide that may be manufactured by one of the known methods and the organic substance, prior to the coking. An intimate mixture of the two components can be obtained from the suspensions by evaporating off the solvent. This mixture is first heated in air, in vacuum or an inert gas to about 300° to 400° C, in order to precoke the organic substance. The greatest loss of weight with intensive gas formation occurs in the precoking process. The organic substance is decomposed into black products. The coking process takes place subsequently at increased temperature, the precoked material being decomposed into elemental carbon. The coking process is carried out, as usual, under exclusion of oxygen, at temperatures of up to 800° to 1,000° C, preferably at 900° C.

In the manufacture of the electrode material in powder form, so much organic substance is advantageously added to the tungsten carbide that the final product contains 1 to 100 percent by weight of free carbon, referred to the tungsten carbide. In setting the weight ratio, it should be taken into consideration that not all the carbon contained in the organic substance remains in the end product. A portion is lost in the form of volatile compounds such as tar. The quantity of carbon in the final product can be determined either analytically or by recording a thermogram. In the coking of sugar, for instance, 30 percent by weight of the organic substance remains in the residue as carbon, in the case of starch, 10 percent and in the case of polyvinyl alcohol and polyacrylic acid, 15 percent.

The porosity of the powdered electrode material prepared according to the invention can advantageously be improved by adding to the mixture of tungsten carbide and the organic substance chamical activating agents such as magnesium chloride, zinc chloride, calcium chloride, potassium thiocyanate, potassium sulfide, sulfuric acid, phosphoric acid, or alkali hydroxides. These activating agents limit the formation of tar to a minimum and aid in the development of a highly porous structure, i.e., in the formation of carbon with a large surface. After the electrode material is produced these activating agents are dissolved out. This elimination process may not be necessary if the activating agent already escapes in the preparation of the electrode material at elevated temperature, such as, for instance, zinc chloride.

After the end product is comminuted, for instance, by milling a suitable grain fraction is screened out and the finished electrode material is built into a power electrode. With the electrode material manufactured according to the invention, the manufacture of large-area electrodes, however, is also possible. For this purpose the starting mixture of tungsten carbide and the organic substance is first fabricated into a film or a thin layer and then subjected to the coking process described. The development of transport pores is assured, if necessary, by the admixture of pore-forming materials. It is easier to apply contacts to a large area electrode of this kind than to a powder electrode.

The invention will be explained in more detail with the aid of several examples of embodiments.
Control Experiment
  a. Preparation of Tungsten Carbide (WC):
    30 g of freshly precipitated and dried tungsten acid were spread out in a thin layer in a quartz boat and reduced in a hydrogen stream in the known manner. To this end, the temperature is first kept at 500° C for 5 hours and subsequently for 5 hours at 700° C. In the first step, the tungstic acid was reduced here to tungsten dioxide, and in the second step to metallic tungsten. After the reduction was completed, carbon monoxide was passed through the quartz tube instead of the hydrogen, and the oven was heated to about 860° C for 6 hours. After cooling in an atmosphere of carbon monoxide, the catalytic material was ready for use.
  b. Recording of the characteristics of an electrode of pure tungsten carbide:
    The characteristics are recorded in the well-known half-cell arrangement according to the principle of the supported electrode. Here, the catalytic material was settled or coated with a deposit of 20 mg/cm$^2$ on an asbestos paper covering layer (diaphragm) of an area of 12.5 cm$^2$. A perforated tantalum sheet served for the support of the asbestos paper covering layer on the electrolyte side. The contact was applied to the catalytic material on the gas side by means of a carbon fabric and a gold plated perforated tantalum sheet. The electrode delivered a current density of 3.0 mA/cm$^2$ at 60° C in 1 m $H_2SO_4$ with a hydrogen pressure of 0.2 newton/mm$^2$ (approximately 2 atm), a coating with 20 mg/cm$^2$ and a polarization of 300 mV. With twice the coating, i.e., wkth 40 mg/cm$^2$, one obtains no larger current, but on the contrary only barely 2 mA/cm$^2$. Because of the lack of wide gas transport pores, the WC material is therefore more poorly utilized, the thicker the electrode.

EXAMPLE 1

1 g of tungsten carbide, prepared according to the previously described method, was mixed with a solution of 3 g of glucose in 10 ml of water, dried on a sand bath, while stirred and precoked at 300° C. Without comminuting, the precoked material was annealed in a tubular furnace for 1 hour in an inert atmosphere at 900° C. The finished electrode material was gound in a mortar, and a grain fraction with a particle size under 150 $\mu$ diameter was subsequently screened out.

An electrode which was prepared as in the control experiment, delivered under the same conditions with a coating of 20 mg/cm$^2$, a current density of 5.2 mA/cm$^2$.

EXAMPLE 2

1 g of tungsten carbide, prepared as in the control experiment, was mixed with a solution of 2.5 g of starch in 10 ml of water and dried as in Example 1, precoked, coked at 900° C for 1 hour under argon, comminuted and screened.

An electrode, which was prepared as in the control experiment, delivered with a coating of 20 mg of electrode material per cm$^2$ and with an overvoltage of 300 mV, measured against the reversible hydrogen potential in the same solution, a current density of 6 mA/cm$^2$, with a hydrogen pressure of 0.2 newtons/mm$^2$ (approximately 2 atm). With a coating of 100 mg/cm$^2$, the electrode delivered 17 mA/cm$^2$ under the same conditions.

EXAMPLE 3

1 g of tungsten carbide, prepared as in the control experiment, was mixed with a solution of 2.5 g of starch and 1 g of magnesium chloride in 20 ml of water, dried as in Example 2, precoked, coked at 900° C, comminuted and screened. The magnesium chloride was washed out with water from the highly porous electrode material before the powder was made into an electrode. With a coating of 20 mg/cm$^2$, the electrode delivered under the same conditions as in the control experiment, a current density of 7 mA/cm$^2$. With a coating of 100 mg/cm$^2$ one obtains a current density of 25 mA/cm$^2$.

What is claimed is:

1. A method for the manufacture of electrode material in powder form containing tungsten carbide for electrochemical cells which comprises intimately mixing tungsten carbide with an organic cokable substance, precoking the organic substance in the mixture, subsequently coking the organic substance by heating to 800° to 1,000° C, and pulverizing the final product.

2. The method of claim 1, wherein the amount of organic substance added to the mixture is such that the final product contains 1 to 100 percent by weight of free carbon, based on the tungsten carbide.

3. The method of claim 2, wherein the added organic substance is a carbohydrate or a polymer.

4. The method of claim 3, wherein tungsten carbide is mixed with an aqueous solution of a carbohydrate; that the mixture is dried and the carbohydrate is pre-coked at a temperature of up to 300° C and is subsequently coked at about 900° C in a protective gas atmosphere.

5. The method of claim 1, wherein a chemical activating agent selected from the group consisting of magnesium chloride, zinc chloride, calcium chloride, potassium thiocyanate, potassium sulfide, sulfuric acid, phosphoric acid and alkali hydroxides is added to the mixture of tungsten carbide and the organic substance to provide an increased porosity in the finished product.

6. The method of claim 5, wherein zinc chloride is used as the pore forming agent.

7. The method of claim 5, wherein magnesium chloride is used as the pore forming agent.

8. The method of claim 1 wherein said electrochemical cells are fuel cells.

9. The method of claim 1 wherein said tungsten carbide is mixed with said organic cokable substance with the latter in the form of a solid.

10. The method of claim 1 wherein said tungsten carbide is mixed with said organic cokable substance with the latter in the form of a liquid.

11. The method of claim 1 wherein said tungsten carbide is mixed with said organic cokable substance with the latter in the form of a solution.

12. The method of claim 1 wherein said organic substance is heated preferably to 900° C during said coking.

* * * * *